United States Patent Office 3,586,565
Patented June 22, 1971

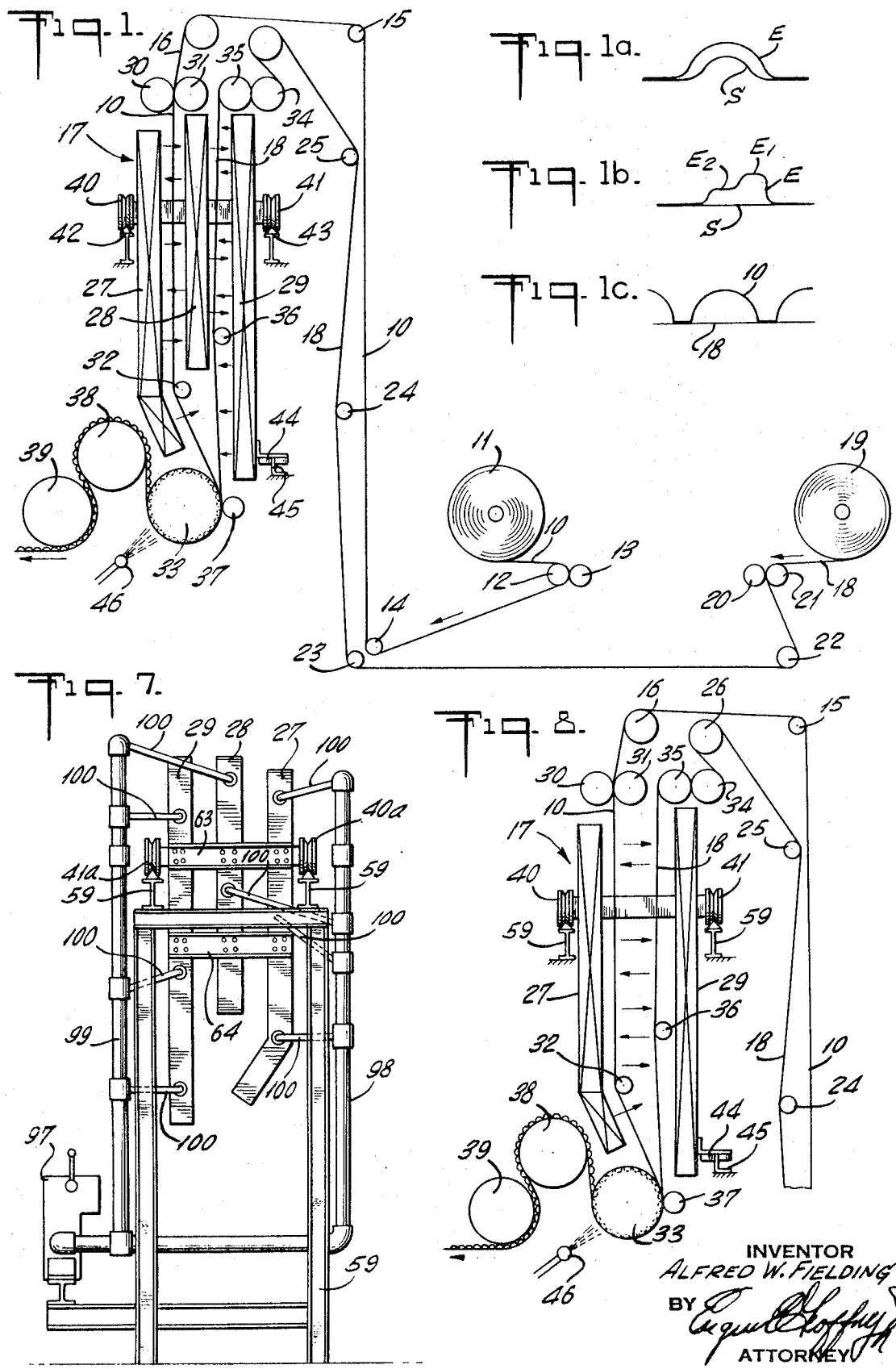

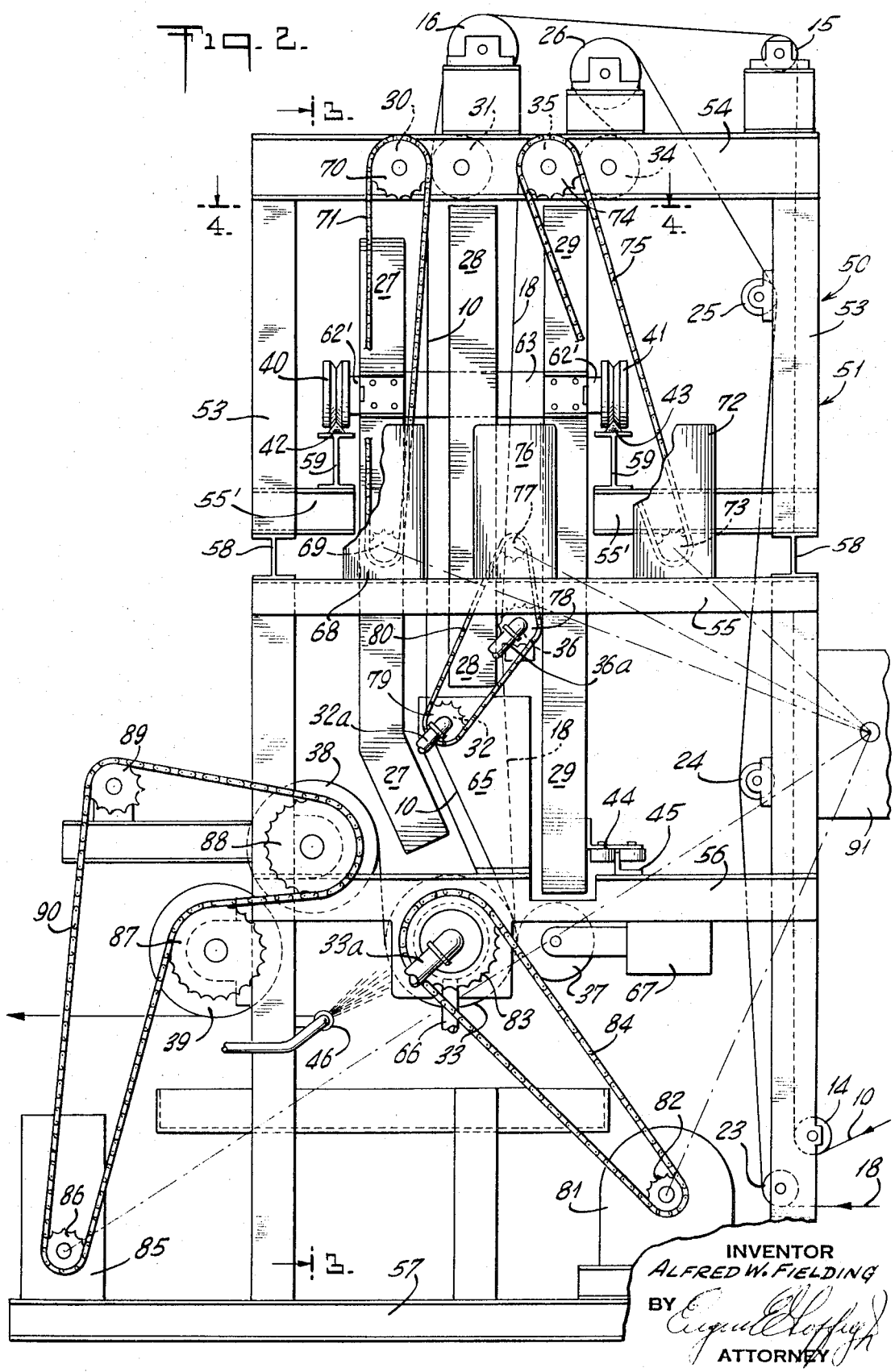

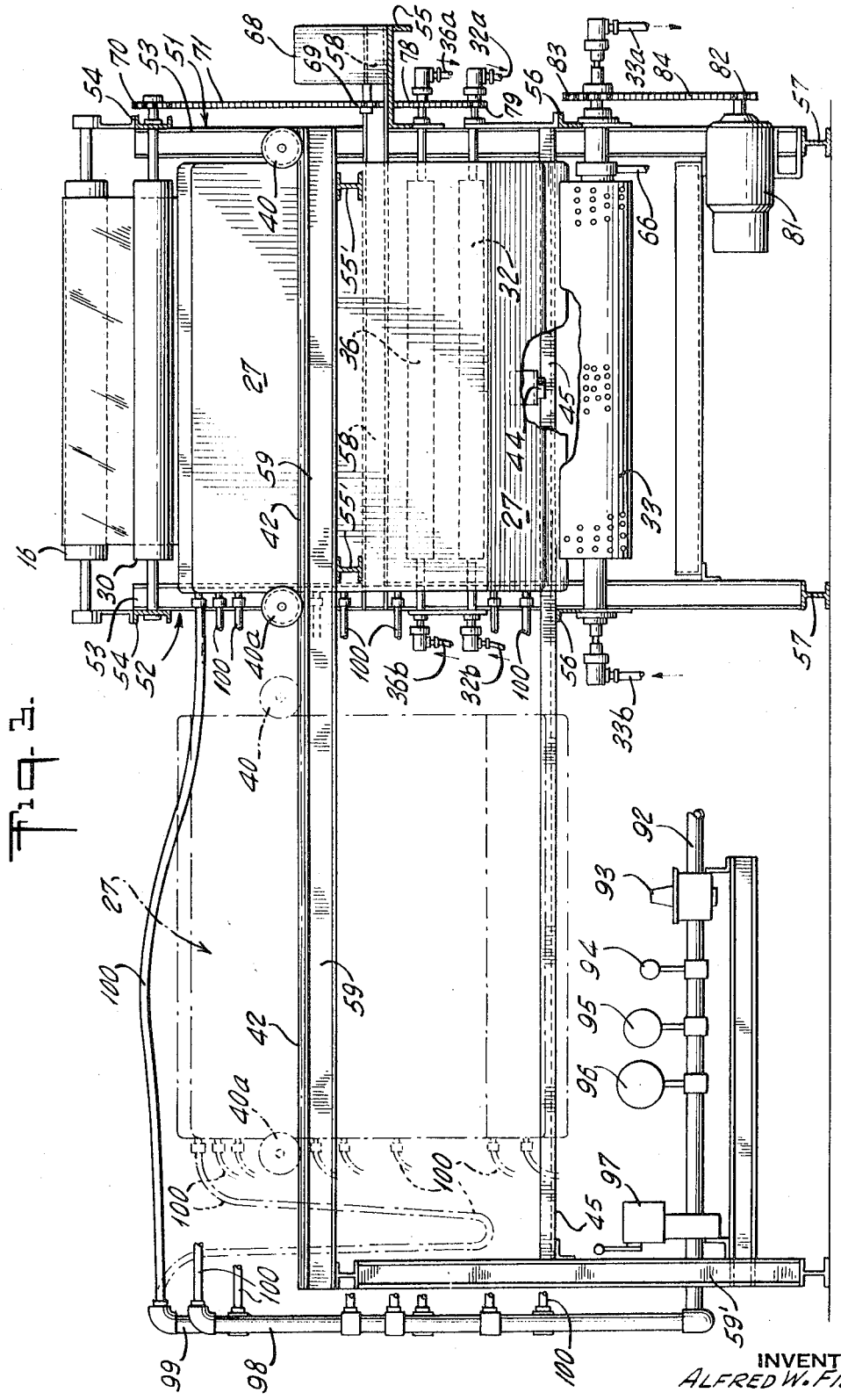

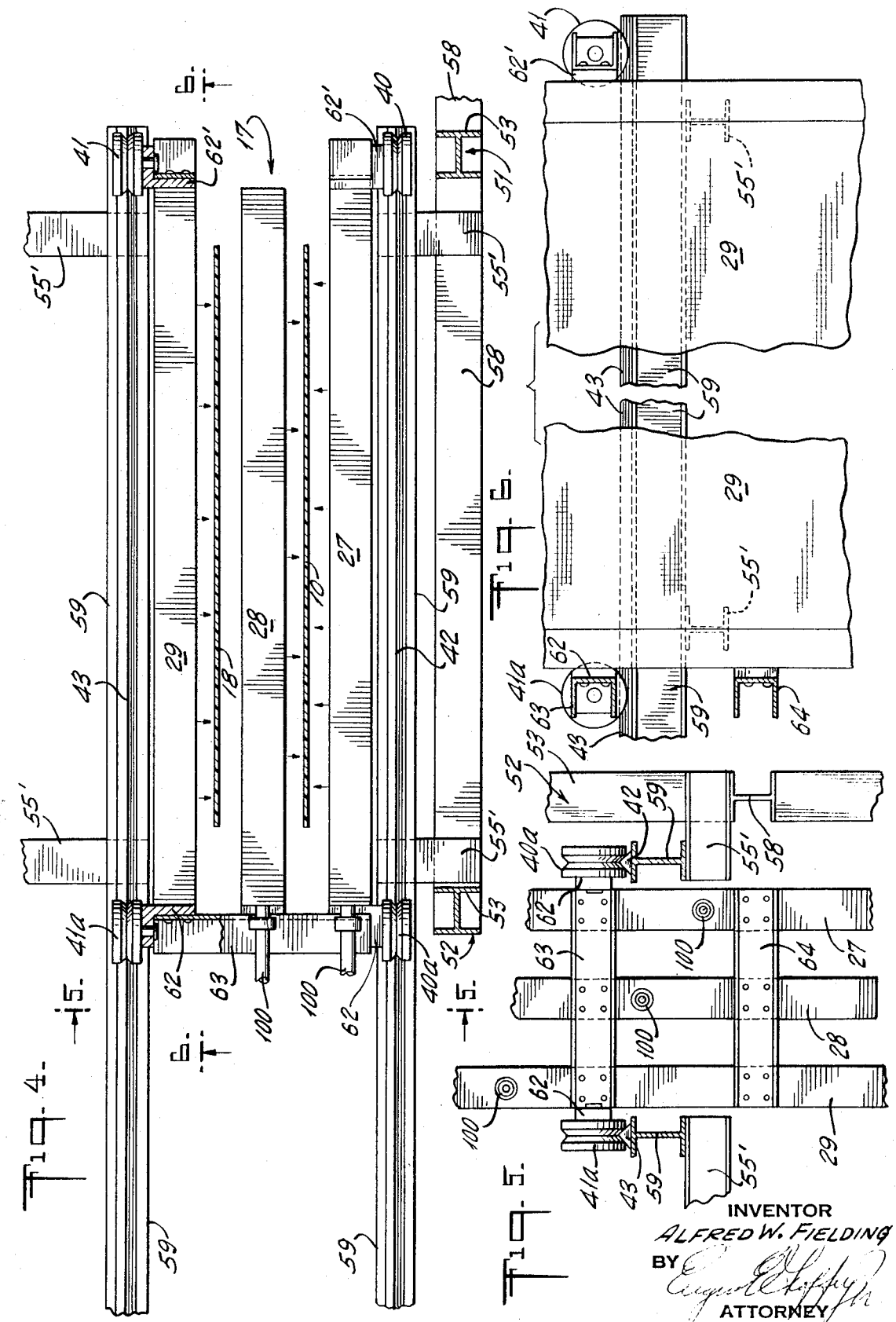

3,586,565
METHOD AND APPARATUS FOR THE MANU-
FACTURE OF CELLULAR AND LAMINATED
MATERIALS
Alfred W. Fielding, Wayne, N.J., assignor to Sealed Air
Corporation, Hawthorne, N.J.
Filed Dec. 4, 1968, Ser. No. 781,070
Int. Cl. B31f 1/20
U.S. Cl. 156—210                                    11 Claims

ABSTRACT OF THE DISCLOSURE

Method and apparatus for manufacturing laminated and laminated cellular materials wherein two sheets of heat sealable plastic material are fed downwardly between radiant heating devices to gradually raise the temperature of the sheets to sealing temperatures, the sheets being substantially unsupported during their downward travel with the final temperature attained just prior to the application of the sheets to an embossing and/or laminating roller for sealing the sheets one to the other and in the case wherein one sheet is embossed to form a plurality of discrete hermetically sealed cells.

This invention relates to an improved method and apparatus for forming cellular and laminated material from a pair of heat sealable plastic sheets which embodies an improved procedure for heating the sheets to sealing temperatures evenly and uniformly without encountering any material elongation or distortion of the sheets prior to sealing of the second sheet of the first sheet.

This invention constitutes an improvement over prior known devices and particularly devices for manufacturing cellular materials utilizing a plurality of rollers which successively raise the temperature of each of two films, an embossing roller to emboss one film and a pressure roller cooperating with the embossing roller to seal the second film to the first film while on the embossing roller to form a cellular material. In prior known devices the films travel at speeds of the order of two hundred feet per minute or greater, and the rollers are heated to temperatures substantially above the temperature which the film is to attain after passing over the roller. Since the films are generally heated to a temperature in the vicinity of their melting points, the rollers must be heated to temperatures considerably in excess of the melting point of the films. It is therefore important with such prior devices to maintain operation at a substantially uniform speed as any sudden interruption or change will cause the films to melt almost instantaneously at points where they are in contact with the heating rollers. Should it be necessary to interrupt the process, the films must be cut and the machine cleared of film before the apparatus is stopped. To initiate operation of the apparatus it is necessary to lace heat resistant webs or leaders through the machine so that when the machine is started, the plastic films will be drawn by the leaders through the apparatus at substantially normal operating speeds.

Another disadvantage of prior known devices for use in heating and laminating plastic films wherein rollers are utilized as the heating means is that the films are not heated uniformly. It has been found that plastic film moving over a roller for heating purposes does not always uniformly contact the roller as the film tends to form elongated wrinkles or channels. While this may occur from expansion of the film during heating or the entrapment of air between the film and the roller, the result is that portions of the film do not contact the roller and accordingly are not heated to the same temperature as other portions of the film. Under these conditions when the heated film contacts the embossing roller the properly heated portions will be embossed to the full depth of the recesses on the embossing roller while improperly heated portions may only be partially embossed prior to the application of the sealing film intended to entrap air within each of the embossments. Since vacuum is continuously applied to each of the recesses in the embossing roller, should the vacuum continue to emboss the underheated portions of the film after the sealing film has been applied, the sealing film will also be embossed. This is an undesirable condition which is generally referred to as double embossing. Another condition which has been found to occur with prior known heating methods and apparatus is incomplete embossing of the film. This occurs when the temperatures of specific areas of the film to be embossed are at a relatively low temperature so that when the film contacts the embossing roller it only partially embosses the film and the vacuum is insufficient to complete proper embossment even after the second film is liminated to the first film.

This invention overcomes the foregoing difficulties encountered with prior known apparatus and provides a novel and improved method and apparatus for heating plastic sheets uniformly and evenly so that the sheet to be embossed is embossed uniformly and evenly throughout its area and at the same time double embossing and incomplete embossing are prevented. The invention further provides a novel and improved arrangement and organization of apparatus wherein the heating means can be quickly removed and operation of the machine interrupted without the need for cutting the films and then rethreading the machine prior to subsequent initiation of operation. Furthermore, with the instant invention, should overheating of the film accidentally occur causing the webs to be torn or broken, the thermoplastic material will not melt on the rollers or other parts of the equipment which would necessitate thorough cleaning before the process could again be initiated.

Still another object of the invention resides in the novel and improved method for heating thermoplastic films prior to embossing of one film and the sealing of a second film to the embossed film which is characterized by its simplicity, dependability, ease of operation and the production of a uniform product.

Still another object of the invention resides in novel and improved apparatus for heating, embossing and laminating thermoplastic films to form cellular material which greatly enhances the efficiency and uniformity of the operation, and reduces the time required to prepare the apparatus for operation after operation has been terminated for any reason whatsoever.

A still further object of the invention resides in the provision of novel and improved means for uniformly heating heat sealable films or sheets including sheets having a heat reactivated coating to sealing temperatures prior to the lamination thereof.

The above and other objects and advantages of the invention will become more apparent from the following description and accompnaying drawings.

In the drawings:

FIG. 1 is a diagrammatic view of one form of apparatus for manufacturing improved cellular material in accordance with the invention;

FIG. 1a is a cross-sectional view of cellular material illustrating double embossing;

FIG. 1b is a cross-sectional view of cellular material illustrating incomplete embossing;

FIG. 1c is a cross-sectional view of properly embossed and sealed cellular material;

FIG. 2 is a side elevational view of one embodiment of apparatus in accordance with the invention;

FIG. 3 is a cross-sectional view of the apparatus shown in FIG. 2 taken along the line 3—3 thereof and illustrating in dotted outline the position of the heating means when removed from the apparatus;

FIG. 4 is a cross-sectional view of FIG. 2 taken along the line 4—4 thereof;

FIGS. 5 and 6 are cross-sectional views of FIG. 4 taken along the lines 5—5 and 6—6 thereof;

FIG. 7 is an end view of the heating apparatus and fuel supply lines of the embodiment of the invention illustrated in FIGS. 2 through 6; and FIG. 8 is a diagrammatic view of a modified embodiment of apparatus in accordance with the invention.

The method and apparatus now to be described is intended for the manufacture of laminated cellular materials utilizing either laminated or unlaminated plastic sheets which can be heat sealed one to the other. Thus each sheet may either be formed of a thermoplastic material or may be formed of any type of material having a sealable surface of plastic.

A diagrammatic view of one embodiment of laminating and embossing apparatus in accordance with the invention is illustrated in FIG. 1. In this embodiment a first sheet of plastic 10 is fed from a roll 11 by a pair of feed rollers 12 and 13 and is then guided by idler rollers 14, 15, and 16 to the top of a heating assembly generally denoted by the numeral 17. A second sheet of plastic 18 is fed from a roll 19 by feed rollers 20 and 21 and is similarly directed by idler rollers 22, 23, 24, 25, and 26 to the top of the heater assembly. The films 10 and 18 or other heat sealable sheet materials are in an unheated state during this portion of their travel and all of the heating takes place within the heater assembly 17.

The heating means or assembly 17 includes, in the embodiment illustrated in FIG. 1, three elongated heaters 27, 28, and 29. The film or sheet 10 upon leaving the roller 16 passes between feed rollers 30 and 31 downwardly between the heaters 27 and 28 whereupon it is guided by the roller 32 to a temperature controlled vacuum embossing roller 33 having a plurality of discrete recesses in the surface thereof in order to emboss the heated film 10. One form of embossing roller is illustrated in U.S. Pat. No. 3,142,599. The second film 18 passes about feed rollers 34 and 35 downwardly between the heaters 28 and 29 and is guided by a roller 36 onto the embossing roller 33 and into overlying relationship with the film 10. It will be observed that the heaters 27 and 29 extend downwardly into close proximity with the embossing roller 33 and further that the heater 29 is greater in length than the heater 27. With this arrangement as the film 10 proceeds downwardly between the heaters 27 and 28, the temperature is gradually raised and the final embossing and sealing temperature is not attained until the film emerges from beneath the heater 27. This procedure enables the film to be self-supporting and at the point of emergence from the heater assembly 17 is immediately applied ot the embossing roller 33. The film 18 is similarly heated but is subjected to heat radiated by the heater 29 for a greater extent of its travel and to insure maintenance of the film 18 at a sealing tempertaure. The film 18 engages the embossing roller 33 at a point after engagement of the film 10 so that the latter is first embossed and then the overlying film 18 is sealed thereto. Sealing is effected by a pressure roller 37 having a resilient coating thereon and held in pressure engagement with the roller 33. The completed cellular material is then removed by means of rollers 38 and 39.

In accordance with the invention, the heater assembly 17 consisting of the heaters 27, 28, and 29 secured one to the other is carried by sets of rollers 40 and 41 riding on tracks 42 and 43. The lower end of the heater 29 carries an L-shaped bracket 44 having a slot engaging an upwardly extending guide 45 to stabilize the heater assembly. As will be described more completely in connection with FIGS. 2 through 6, this mode of supporting the heater assembly 17 facilitates its removal from the apparatus without interrupting the operation of the machine. With this arrangement should it be desired to terminate the embossing and sealing operation, the heaters can be removed whereupon the apparatus can be stopped after all of the film which had been subjected to heat leaves the roller 33. In normal practice it is desirable to provide a water spray 46 to rapidly cool the embossed and sealed films just prior to their removal from the embossing roller 33. As a consequence, when the embossing operation is to be temporarily terminated and the heater assembly 17 withdrawn, it is only necessary to be certain that that portion of the film which has been subjected to heat completely clears the cooling spray 46. To initiate the operation of the process it is merely necessary to start the apparatus and after the film has attained the desired speed the heater assembly is moved into position to perform the function as previously described.

With the embodiment of the invention as shown in FIG. 1, all portions of the two films will be uniformly heated with the result that the cellular material is uniformly embossed and conditions such as double embossing or incomplete embossing are avoided. As previously pointed out, when plastic film is heated by passing it over a series of rollers, portions of the film by reason of expansion and entrapment of air do not contact the heating rollers. As a result, portions of the film to be embossed have been found to attain different temperatures some of which may even be below the necessary embossing temperature for the particular film. These undesirable conditions are illustrated in FIGS. 1a and 1b. In FIG. 1a, which illustrates so-called double embossing, the film E which was to be embossed was at a temperature slightly below the desired embossing temperature so that the film was only partially embossed prior to the application of the sealing film S. As a consequence, the continued application of vacuum ultimately embossed the film E, but in so doing it also partialy embossed the film S. Such a condition does not provide the cushioning effect obtained with a properly embosed film as diagrammatically illustrated in FIG. 1c. It will be observed in FIG. 1c that the film 10 which corresponds to the film E of FIG. 1a is completely embossed while the film 18 sealing the embossment maintains a substantially planar condition. Incomplete embossing is illustrated in FIG. 1b. In this figure it will be observed that the film E is irregularly embossed since portion $E_1$ was at a higher temperature than the portion $E_2$. The portion $E_2$ was at such a low temperature that the vacuum was unable to complete the embossing before the film was cooled and thus the sealing film S lies flat against the film E and does not show evidence of double embossing as in the case of FIG. 1a.

One embodiment of apparatus for carrying out the process as described in connection with FIG. 1 is illustrated in FIGS. 2 through 7. For clarity the corresponding elements of FIGS. 2 through 7 and FIG. 1 are denoted by like numerals. In this embodiment of the invention the apparatus frame is generally denoted by the numeral 50 and has side portions 51 and 52. The side 51 of the frame 50 is formed of a pair of vertical columns 53 connected by suitable cross beams 54, 55, 56, and 57. The side 52 of the frame 50 is similarly constructed and the two side portions 51 and 52 are connected by transverse members including I-beams 58. A pair of spaced tracks 42 and 43 extend transversely of the frame and substantially beyond the side portion 52 of the frame. It will be observed that the transverse I-beam 55' of the side portion 52 is interrupted as viewed in FIG. 4 to permit movement of the heater assembly 17 from a position within the frame 50 to a position removed from the frame 50 as illustrated in dotted outline in FIG. 3.

The heater assembly 17 is supported by two sets of rollers 40–40a and 41– 41a which engage the tracks 42 and 43. The rollers 40a and 41a are carried by vertically disposed angle beams 62 supported in spaced relationship by transverse channels 63 and 64. The heater 27 of the heater assembly 17 is secured at one end to the vertically disposed angle beam 62 and is supported at the other end by an angle beam 62' which carries the roller 40. The heater 29 is similarly supported to the other angle beam 62 on one end and to a second angle beam 62' carrying the second roller 41. The central heater 28 is merely supported at the left side as viewed in FIG. 4 by attachment to the transverse channels 63 and 64. With this arrangement it will be observed that the films of sheets 10 and 18 move downwardly between the central heater 28 and the outer heaters 27 and 29 and further the entire heater assembly 17, while the sheets 10 and 18 are in position therein, can be moved to the left as shown in FIG. 4 without interfering with the sheets. As a result, should it be desired to interrupt the embossing and sealing operations, the heater assembly 17 can be displaced outwardly from the apparatus whereupon the apparatus can then be stopped without severing the sheets which would then require rethreading of the apparatus. To resume operation, the apparatus can then be started and the heaters moved back into position to perform the heating operation. In order to stabilize the heating assembly 17, the transverse beam 56 on the side portion 51 of the frame 50 carries one end of the L-shaped guide 45 and the other end is similarly supported by the side portion 52. The lower edge of the heater 29 carries a slotted member 44 which engages the guide 45 and thereby prevents the heater assembly from being tilted from the vertical position.

The path of the films 10 and 18 may be observed more clearly in FIG. 2. It will be observed that the film 10 is fed about the roller 14 which is carried by the side frame portions 51 and 52. The film then moves directly upwardly and about the roller 15 disposed on top of the frame. The roller 16 is positioned above the feed rollers 30 and 31 and the film after moving over the roller 16 moves downwardly between the rollers 30 and 31 and then about the roller 32 to the vacuum embossing cylinder 33. The cylinder 33 as well as the rollers 30, 31, and 32 are all supported by the side frames 51 and 52. In the case of the roller 32, the side frame 52 includes a plate 65 carried by the transverse beam 56 in order to support one end of the roller 32 without interfering with the transverse movement of the heater assembly 17.

The film 18 is guided by rollers 23, 24, and 25 carried by the frame portions 51 and 52 and thence moves upwardly about the roller 26 on the top of the frame 50 and downwardly about the rollers 34 and 35 also disposed between the side frame portions. The film 18 then moves downwardly about the roller 36 and thence onto the embossing roller 33 in overlying relationship with the film 10. Since the film 10 engages the surface of the embossing cylinder in advance of the film 18, the vacuum applied to the cylinder 33 by the conduit 66 will cause the film 10 to become embossed whereupon the engagement of the film 18 will function to seal the embossments to provide sealed air cells. A pressure roller 37, urged against the embossing roller 33 by fluid actuated cylinders 67, insures a hermetic seal between the two films.

After the films or sheets have been embossed and sealed on the embossing cylinder 33, the sheets are then cooled by the water spray 46 whereupon the completed material is then removed from the embossing cylinder by rollers 38 and 39.

In the operation of the apparatus it is desirable to carefully control the speeds of certain of the rollers in order to avoid deformation of the films or sheets 10 and 18. For this purpose variable speed drives are utilized to drive the various rollers and embossing cylinder and for convenience such drives are synchronized by powering them from a single variable frequency generator. More specifically the rollers 14, 15, and 16 guiding the film 10 to the rollers 30 and 31 are merely idler rollers since the film during this portion of its path is in a cold state. The roller 30 which cooperates with the roller 31 to grip the film 10 as it passes therethrough is driven by a variable speed device 68 which is coupled to the roller 30 by sprockets 69 and 70 and a chain 71. The film 18 is drawn over the idler rollers 23, 24, 25, and 26 and is then fed downwardly by cooperating pressure or feed rollers 34 and 35. The roller 35 is driven by the variable speed unit 72 by means of sprockets 73 and 74, and a chain 75. The rollers 32 and 36 are driven by the variable speed unit 76 by means of sprockets 77, 78, and 79 and a chain 80. The embossing roller 33 is driven by the variable speed drive 81 which is coupled to the embossing roller by sprockets 82 and 83 and chain 84. The take-off rollers 38 and 39 are driven by the variable speed drive 85 by means of the sprockets 86, 87, 88, and 89 and the chain 90. Each of the variable speed drives 68, 72, 76, 81, and 85 are all controlled by a common variable frequency generator 91 so that the speed of the apparatus can be varied merely by varying the frequency of the generator 91. In this way once all of the variable speed drives are properly coordinated to provide the desired tension on the sheets as they move through the apparatus, a single control may be used to vary the speed of operation. For convenience broken lines are used to indicate the electrical connections between the generator 91 and the variable speed drives.

Inasmuch as the sheets 10 and 18 are being progressively heated as they proceed downwardly through the heater assembly 17 it is desirable to maintain the rollers 32 and 36 at appropriate temperatures so that they will not have a tendency to cool the films when the apparatus is first started yet will not overheat the films because of the heat absorbed from the heater assembly. Accordingly, each of these rollers is temperature controlled by passing a temperature control fluid therethrough. In the case of polyethylene, it would be desirable to maintain the rollers 32 and 36 at about 170° F., and this can be accomplished by circulating water or other suitable liquid to the inlet pipes 32a and 36a and withdrawing it from the outlet pipes 32b and 36b. Any suitable heating or cooling device to automatically control the temperature of the fluid may be utilized to effect this end. The embossing roller 33 is similarly temperature controlled by passing a liquid into the inlet 32a and withdrawing it from the outlet 33a. The detailed construction of the embossing roller 33 has been illustrated and described in prior U.S. Pats. Nos. 3,142,-599 and 3,208,898, granted July 28, 1964 and Sept. 28, 1965, respectively.

While the heater assembly may be operated by electrical energy or other form of fuel, in the instant embodiment of the invention, the heaters 27, 28, and 29 are heated by a gaseous fuel. The gas enters the apparatus through the inlet pipe 92 and then passes through control devices 93, 94, 95, 96, and 97 for controlling the gas pressure and interrupting the flow of gas both manually and automatically. The gas is then distributed between a pair of vertically disposed manifolds 98 and 99 which are in turn connected to the heaters 27, 28, and 29 by flexible hoses 100 as may be viewed more clearly in FIGS. 3 and 7. The use of the flexible hoses permits the heater assembly 17 to be moved into and out of its operating position. If desired, the outer ends of the tracks 42 and 43 may be supported by a U-shaped frame 59 as viewed more clearly in FIG. 7.

An alternate embodiment of the invention is shown in FIG. 8. This form is identical to the form of the invention illustrated and described in connection with FIGS. 1 through 7 and accordingly corresponding numerals have been used to denote corresponding elements in the two forms of the invention. The structure shown in FIG. 8 differs form that shown for instance in FIG. 1 in that the heater assembly 17 merely includes a pair of heaters 27 and 29 and omits the central heater 28. It is has been found that the heat radiated from the inner surfaces of the heaters 27 and 29 will penetrate the sheets 10 and 18 and permit the production of a cellular material and the attainment of a hermetic seal therebetween. The structure of FIG. 8 has been found effective with polyethylene coated with polyvinylidene chloride and wherein the sheets are of the order of 1 to 3 mils in thickness. It is to be understood that the central heater may also be used in connection with the thinner material by controlling the rate of heating.

From the foregoing description of the several embodiments of the invention, it is apparent that the two sheets 10 and 18 are self-supporting as they pass downwardly through the heater assembly 17. As a result, the sheets do not contact highly heated rollers so that the operation of the machine can be interrupted at any time without severing the sheets and merely by removing the heating assembly from within the frame 50. Furthermore, since the sheets are heated gradually as they proceed in a downward direction they do not attain the fusing or sealing temperature until just prior to their emergence from the heater assembly. In addition, the heater 29 may be somewhat longer than the heater 27 to insure maintenance of the sealing sheet 18 at the sealing temperature. This is desirable in certain instances since that sheet is not being embossed and the additional heat will facilitate effecting a good seal. It is also important to note that the sheets 10 and 18 are heated uniformly throughout their areas so that the conditions described in connection with FIGS. 1a and 1b are overcome and the film 10 is uniformly embossed as shown in FIG. 1c and prior to the application of the sealing film 18. It is also evident that while the embodiments of the invention illustrated and described are particularly useful for manufacturing cellular material, they may also be used for laminating plastic sheets in which case a smooth roller would be used to replace the embossing roller 33.

The invention as described can be utilized with sheets at least one of which includes a coating of heat reactivatable material to effect the seal therebetween, it being understood that when making a cellular product one of the sheets must be formable through not necessarily sealable in the absence of the heat reactivated coating.

While only certain embodiments of the invention have been illustrated and described, it is apparent that alterations, modifications and changes may be made without departing from the scope of the invention.

What is claimed is:

1. The method of embossing and laminating heat sealable sheets of plastic material comprising the steps of feeding said sheets substantially vertically downwardly in spaced relationship, positioning heating means along the vertical downward path of said sheets while supporting said sheets above the heating means, irradiating said sheets with radiant heat to progressively raise the temperatures thereof as they move substantially freely downwardly until they attain sealing temperatures, feeding said sheets successively and continuously onto a movable embossing and laminating surface immediately upon attainment of said sealing temperatures so that one sheet will engage said surface and be embossed just prior to the application of the other sheet, applying pressure to said sheets while in overlying relationship on said embossing surface to substantially uniformly seal the sheets one to the other and then cooling said laminated and embossed sheets.

2. The method of embossing and laminating heat sealable sheets of plastic according to claim 1 wherein said radiant heat is directed toward the outer facing surfaces of said sheets to uniformly heat said sheets.

3. The method of embossing and laminating heat sealable sheets of plastic according to claim 1 wherein both surfaces of each sheet are irradiated with said radiant heat.

4. The method of embossing and laminating heat sealable sheets of plastic according to claim 1 wherein said laminated and embossed sheets are cooled while on said movable laminating and embossing surface.

5. The method of laminating heat sealable sheets of material comprising the steps of feeding said sheets substantially vertically downwardly in spaced relationship, positioning heating means along the vertical downward path of said sheets while supporting said sheets above the heating means, irradiating said sheets with radiant heat to progressively raise the temperatures of said sheets as they move substantially freely downwardly until at least the facing surfaces of said sheets attain heat sealing temperatures, feeding said sheets onto a movable laminating surface immediately upon the attainment of said heat sealing temperatures, applying pressure to said overlying sheets while on said surface and then cooling the laminated sheets.

6. Apparatus for manufacturing cellular material comprising a heater assembly having at least two substantially vertically disposed heaters positioned in spaced relationship, said heaters directing radiant energy into the space therebetween, means for supporting said sheets adjoining the tops of said heaters and continuously guiding two sheets of heat sealable plastic substantially vertically downwardly in spaced relationship between said heaters, a continuously moving embossing and laminating surface for successively receiving said sheets upon emergence from between said heaters, means for guiding said sheets onto said laminating surface with one of said sheets contacting said surface in advance of the other to effect embossment thereof prior to application of said second sheet, means for continuously applying pressure to successive portions of said sheets while in overlying relationship on said surface to seal them one to the other, means for cooling said sheets to effect a permanent seal and then removing the completed material from said surface.

7. Apparatus for manufacturing cellular material according to claim 6 including means for displacing said heater assembly and said sheets transversely one relative to the other to interrupt the heating process.

8. Apparatus for manufacturing cellular material according to claim 6 wherein said heater assembly includes a third heater interposed between the first said heaters and radiates heat energy from both sides thereof and means for guiding each of said sheets between said third heater and one of the first said heaters.

9. Apparatus for manufacturing cellular material comprising a heater assembly having at least two substantially vertically disposed heaters positioned in spaced relationship, said heaters directing radiant energy into the space therebetween, means for continuously guiding two sheets of heat sealable plastic downwardly in spaced relationship between said heaters, a continuously moving embossing and laminating surface for successively receiving said sheets upon emergence from between said heaters, one of said sheets contacting said surface in advance of the other to effect embossment thereof prior to application of said second sheet, means for continuously applying pressure to successive portions of said sheets while in overlying relationship on said surface to seal them one to the other, means for cooling said sheets to effect a permanent seal and then removing the completed material from said surface, said apparatus further including a frame having spaced side portions, spaced track means extending between said side portions and extending outwardly beyond one of said side portions, a carriage engaging said track means and carrying said heater assembly for movement to and from positions between said side portions and outwardly beyond said one side portion and guiding rollers extending between said side portions of said frame to guide said sheets downwardly through said heater assembly and wherein said moving embossing and laminating surface is a vacuum roller disposed immediately beneath said heater assembly and supported by the side portions of said frame.

10. Apparatus for manufacturing cellular material according to claim 9 wherein said guiding rollers comprise two sets of abutting rollers with one set of abutting rollers supporting and feeding one sheet downwardly through said heating assembly and the other set of abutting rollers supporting and feeding the other sheet downwardly through said heating assembly.

11. Apparatus according to claim 9 wherein said heater assembly includes a third heater interposed between the first said heaters and radiates heat from both sides thereof and guiding rollers guide one of said sheets between said third heater and one of the first said heaters and the other of said sheets between said third heater and the other of the first said heaters.

References Cited

UNITED STATES PATENTS

| | | | |
|---|---|---|---|
| 2,898,973 | 8/1959 | Marsh | 156—499 |
| 3,142,599 | 7/1964 | Chavannes | 156—210 |
| 3,316,137 | 4/1967 | Wisotzky | 156—306X |
| 3,360,412 | 12/1967 | James | 156—272X |

SAMUEL W. ENGLE, Primary Examiner

U.S. Cl. X.R.

156—219, 376, 499